(12) United States Patent
Iwai

(10) Patent No.: US 7,365,807 B2
(45) Date of Patent: Apr. 29, 2008

(54) LCD TELEVISION, FLAT PANEL TELEVISION, AND TELEVISION CABINET

(75) Inventor: Akio Iwai, Daito (JP)

(73) Assignee: Funai Electric Co., Ltd., Dalto-shi, Osaka (JP)

(*) Notice: Subject to any disclaimer, the term of this patent is extended or adjusted under 35 U.S.C. 154(b) by 537 days.

(21) Appl. No.: 10/971,395

(22) Filed: Oct. 22, 2004

(65) Prior Publication Data
US 2005/0115735 A1    Jun. 2, 2005

(30) Foreign Application Priority Data
Oct. 22, 2003    (JP)    ............... 2003-361901

(51) Int. Cl.
*H04N 5/64* (2006.01)
(52) U.S. Cl. .............. 348/794; 348/836; 312/7.2; 361/681
(58) Field of Classification Search .............. 348/794, 348/836–843, 787, 825; 220/324, 4.26, 4.21, 220/306, 302, 4.02; 361/681, 682, 683; 312/7.1, 312/7.2
See application file for complete search history.

(56) References Cited

U.S. PATENT DOCUMENTS 4,089,580 A * 5/1978 Huffnagle et al. .......... 439/400
4,212,415 A * 7/1980 Neely .......... 222/231
4,850,657 A * 7/1989 Placke et al. .......... 361/685
6,928,704 B2 * 8/2005 Johnson .......... 24/130

FOREIGN PATENT DOCUMENTS

JP    01-95785    6/1989
JP    07-212057    8/1995
JP    11-54962    2/1999

OTHER PUBLICATIONS

Notice of Reasons for Refusal, JP app. 2003-361901 (prior foreign application), mailed Jul. 20, 2005.

* cited by examiner

*Primary Examiner*—M. Lee
(74) *Attorney, Agent, or Firm*—Peter Ganjian

(57) ABSTRACT

An LCD television in which a cable is fixed firmly with no possibility of loosening and the rigidity of its cabinet is enhanced. In the cabinet composed of a front cabinet and a rear cabinet, the cable extended from a speaker is passed through latch ribs in a zigzag manner on a cable path on the inside of a front wall of the front cabinet. When the front cabinet and the rear cabinet are joined, the latch ribs are engaged with latch rib receptacles. As a consequence, the cable is firmly fixed on the cable path and never comes off the latch ribs. The latch ribs engaged with the latch rib receptacles also function as reinforcement ribs to increase the rigidity of the television cabinet which constitutes an LCD television.

9 Claims, 7 Drawing Sheets

Cable Path Direction

LCD TELEVISION, FLAT PANEL TELEVISION, AND TELEVISION CABINET

BACKGROUND OF THE INVENTION

1. Field of the Invention

The present invention relates to LCD televisions, flat panel televisions and television cabinets and more particularly to LCD televisions, flat panel televisions and television cabinets which have internal cables fixed in prescribed positions.

2. Description of the Related Art

In the conventional method of fixing internal cables in an LCD television, non-woven fabric is pasted onto the cables laid in required positions on the inside of the television cabinet.

A known cable fixing structure is a cable fastener having at least three latch pieces arranged in a zigzag manner at regular intervals on a board, where each latch piece consists of a cable latching part with a U-shaped cross section in a line perpendicular to the arrangement direction and a cable hooking part made by partially cutting the U-shaped portion, and the cable hooking parts of the neighboring latch pieces are located on alternate sides (for example, see Patent Literature 1: JP-U No.95785/1989).

In this cable fastener, a cable is passed through the hooking parts of the latch pieces into the latching part to fix the cable.

Another known approach to fixing cables is a cable holding structure which consists of a cable holder having at least three rows of rod-like friction studs arranged in a matrix pattern protruding from one surface of a plate-like base (see Patent Literature 2: JP-A No.212057/1995).

In this cable holding structure, cables are passed in a zigzag manner between the friction studs arranged vertically so that they are engaged with the studs and thus held by the cable holder by means of friction resistance between the outer surfaces of the cables and those of the friction studs. In addition, a stopper plate is fixed near the tops of the friction studs to prevent the cables form coming off the cable holder even when the cables are pulled toward the tops of the friction studs.

The use of non-woven fabric to fix cables as described above leads to a larger number of components and higher cost. Besides, such a method involves the risk that the worker may fix a cable in a wrong position and have to re-paste the fabric; if so, an additional cost and more man-hours would be required.

On the other hand, in some cases the inner surface of a television cabinet is made concavo-convex or irregular in a net pattern in order to decrease the weight of the cabinet and increase its rigidity. Actually, when non-woven fabric was used to fix cables on such a net-patterned irregular surface, sometimes the cables could not be fixed firmly because the total fabric contact area was too small and the cable holding effect of the fabric was insufficient. With this background, there has been demand for means to decrease the television cabinet weight and increase its rigidity and at the same time fix cables securely without using non-woven fabric.

In the technique disclosed in Patent Literature 1, since the hooking part is open, a cable may come off a latch piece; if a cable should come off a latch, the cable holding effect would decline.

In the technique disclosed in Patent Literature 2, friction studs onto which cables are latched are not directly engaged with the stopper plate. Therefore, it is impossible to engage the cable latching block with the block opposite to it in order to increase the rigidity of the television cabinet.

SUMMARY OF THE INVENTION

The present invention has been made in view of the above problems and provides an LCD television, a flat panel television and a television cabinet which make it possible to fix cables in required positions securely and provide high rigidity.

In order to achieve the above object, the present invention has various aspects as follows. According to one aspect of the invention, in an LCD television in which a cable extended from a speaker housed in a television cabinet, composed of a front cabinet and a rear cabinet, is fixed in a prescribed position on the inside of the front cabinet, the front cabinet has latch ribs in plural places on a front wall of the front cabinet, each of the latch ribs comprising three rib pieces standing on the front wall of the front cabinet almost vertically almost in line with given gaps between them, so as for the cable to be passed through the gaps in a zigzag manner and thereby fixed. The rib pieces are tapered and the center rib piece is higher than the rib pieces on both sides of it and support members are provided on the rib piece wall surfaces which are supposed not to face the cable when the cable is passed through the gaps in a zigzag pattern, in order to prevent inclination of the rib pieces toward those wall surfaces. The rear cabinet has latch rib receptacles in such plural places that they fit the latch ribs respectively and house the rib pieces of each latch rib with the center rib piece inserted by a given depth from its top when the rear cabinet is attached to the back of the front cabinet.

As described above, in the above LCD television, the television cabinet, composed of a front cabinet and a rear cabinet, houses a speaker and the cable from the speaker is fixed in a prescribed position on the inside of the front cabinet. The cable connects an electronic component housed in the television cabinet to the speaker. Since the cable is long enough to do so, it must be fixed in a prescribed position on the inside of the front cabinet and laid properly between the speaker and the electronic component so that it does not loosen nor get in the way of other components.

For this reason, the front cabinet has, in plural places on the inside of its front wall, latch ribs each of which includes three rib pieces standing on the front wall almost vertically almost in line with given gaps between them, as described above. The cable is passed through the gaps between the three rib pieces of a latch rib in a zigzag manner to fix it. In other words, the cable is passed in front of the alternate wall surfaces of the neighboring rib pieces. The cable skews through the latch rib in a zigzag manner, and as it passes through each gap of the rib, it touches the rib pieces standing on both sides of the gap at several points. Even when some tensile force is applied to the cable, friction resistance generated between the cable and the rib pieces prevents slippage of the latched cable. In other words, the cable is firmly fixed in a prescribed position on the inside of the front wall by latching it with the latch ribs.

If the latch rib is designed so as to facilitate cable latching work, the worker can fix the cable on the front cabinet more easily and more efficiently. For this reason, the rib pieces of the latch rib are tapered and the center rib piece is higher than the rib pieces on both sides of it. The worker can pass the cable through the gaps of a latch rib with tapered rib pieces more easily than with rib pieces whose width is constant along the height. When the center rib piece is higher than the rib pieces on both sides of it, the worker can easily pass the cable through the gaps on both sides of the center rib piece by hooking it onto the center rib piece.

As mentioned above, as the cable is led through the latch rib in a zigzag manner, it passes in front of the alternate wall surfaces of the neighboring rib pieces. If there are no support members for the rib pieces, the rib pieces will receive a force from the cable passing in front of their wall surfaces toward a direction almost perpendicular to the array of three rib pieces, and slightly incline toward the wall surfaces not facing the cable. In other words, without support members for the rib pieces, the neighboring rib pieces would slightly incline in alternate directions. For this reason, the rib pieces are provided with support members which prevent inclination of the rib pieces toward the wall surfaces supposed not to face the cable, when the cable is passed in a zigzag manner. As a consequence, the support members prevent inclination of the rib pieces in alternate directions and the array of neighboring rib pieces which constitute a latch rib is held almost linear. This is important in engaging a latch rib with a latch rib receptacle as stated later.

With the above structure, the worker can latch the cable with the latch rib easily and fix it in a prescribed position on the inside of the front cabinet. Besides, the present invention provides a means to prevent the cable from coming off the latch rib without fail. The rear cabinet has latch rib receptacles in such plural places that they fit the latch ribs respectively and house the rib pieces of each latch rib with the center rib piece inserted by a given depth from its top when the rear cabinet is attached to the back of the front cabinet. In other words, when the rear cabinet is attached to the back of the front cabinet, the latch ribs engage with the latch rib receptacles and the cable latched with the latch ribs can not come off. The front end of each latch rib receptacle, facing the inside of the front cabinet, presses the cable from behind the front cabinet. Thus the cable is fixed in a prescribed position on the inside of the front cabinet further firmly.

Since the above support members keep the positional relationship among the rib pieces of each latch rib almost linear, the position of each rib piece with regard to the corresponding latch rib receptacle is held correct so the receptacle houses the rib piece properly.

Another advantage is that the engagement of the latch ribs of the front cabinet and the latch rib receptacle of the rear cabinet increases the rigidity of the television cabinet which constitutes the LCD television. The latch ribs engaged with the latch rib receptacles perform the function of fixing the cable from the speaker in a prescribed position on the inside of the front cabinet and also the function as reinforcement ribs which increase the rigidity of the television cabinet.

The worker only has to lead the cable through the latch ribs in several places on the inside of the front wall of the front cabinet. In the conventional method which uses non-woven fabric to fix the cable, workers sometimes fixed the cable in a wrong position and had to re-paste the fabric. On the other hand, the fixing method in the present invention eliminates the possibility of such errors so that the cable fixing work efficiency is improved and non-woven fabric is no longer needed, leading to cost reduction in the manufacture of LCD televisions. The other aspects of the invention described below also contribute to the advantageous effects of improved cable fixing work efficiency and cost reduction.

According to a second aspect of the invention, in a flat panel television in which a cable inside a television cabinet is fixed in a prescribed position on the inside of the television cabinet, the television cabinet has, on its inside, a latch rib including plural rib pieces arranged almost in line with given gaps between them, so as for the cable to be passed through the gaps in a zigzag manner and thereby fixed.

The television cabinet also has, on its inside, a latch rib receptacle to engage with the latch rib, in a prescribed position opposite to the latch rib.

As described above, in the above flat panel television, the cable inside the television cabinet is fixed in a prescribed position on the inside of the television cabinet. The television cabinet has, on its inside, a latch rib which includes plural rib pieces arranged almost in line with given gaps between them. The cable is passed through the gaps between the rib pieces in a zigzag manner so that it is fixed in a prescribed position. Like the above LCD television, the cable skews in a zigzag manner; as it passes through each gap, it touches the rib pieces standing on both sides of the gap at several points. As a consequence, even when some tensile force is applied to the cable, friction resistance generated at the several points prevents slippage of the latched cable. In short, the cable is firmly fixed in a prescribed position on the inside of the television cabinet by latching it with the latch rib.

In addition, a latch rib receptacle to engage with the latch rib is provided in a prescribed position opposite to the latch rib, on the inside of the television cabinet. When the latch rib is engaged with the latch rib receptacle, the cable latched with the latch rib can not come off. The front end of the latch rib receptacle engaged with the latch rib presses the cable latched with the latch rib, so the cable is fixed in a prescribed position on the inside of the front cabinet further firmly. The latch rib engaged with the latch rib receptacle also functions as a reinforcement rib which increases the rigidity of the television cabinet.

According to a third aspect of the invention, in the above flat panel television, the rib pieces have support members on their wall surfaces supposed not to face the cable when the cable is passed through the gaps in a zigzag manner, in order to prevent inclination of the rib pieces toward those wall surfaces.

In this structure with support members, when the cable is passed through the latch rib in a zigzag manner, the three rib pieces receive a force from the cable toward a direction almost perpendicular to the array of three rib pieces as the cable passes in front of the alternate surfaces of the neighboring rib pieces. For this reason, the support members are provided on the rib pieces in order to prevent the rib pieces from inclining, due to the force from the cable, toward the wall surfaces which are supposed not to face the cable. As a consequence, the positional relationship of the tops of the rib pieces which constitute a latch rib, is held almost linear so the positions of the rib pieces with regard to the latch rib receptacle are kept correct to ensure that the latch rib is securely engaged with the latch rib receptacle.

According to a fourth aspect of the invention, in the above flat panel television, the latch rib consists of three rib pieces and the center rib piece is higher than the rib pieces on both sides of it.

In the above structure, the number of rib pieces which constitute the latch rib is arbitrary. When the latch rib includes three rib pieces, it has two gaps as mentioned above and the cable can be passed through the latch rib in a zigzag manner to fix it firmly.

When the center rib piece is higher than the rib pieces on both sides of it, the worker can easily pass the cable through the gaps on both sides of the center rib piece by hooking the cable onto the top of the center rib piece.

According to a fifth aspect of the invention, in a flat panel television as mentioned above, the rib pieces are tapered.

This is because the worker can pass the cable through the gaps of the latch rib with tapered rib pieces more easily than with rib pieces whose width is constant along the height.

The explanation given so far concerns an LCD television or flat panel television which has both latch ribs and latch rib receptacles as mentioned above. In this connection, a television cabinet with only a latch rib as mentioned above is considered as a useful invention.

Hence, according to a sixth aspect of the invention, a television cabinet has a latch rib which includes plural rib pieces arranged almost in line with given gaps between them, so as for a cable to be passed through the gaps in a zigzag manner and thereby fixed. In this television cabinet, each rib piece has a support member on its wall surface supposed not to face the cable when the cable is passed through the gaps in a zigzag manner, in order to prevent inclination of the rib piece toward that wall surface. In short, a television cabinet with a latch rib as used in the flat panel television according to the third aspect is considered as a useful invention.

According to a seventh aspect of the invention, in the television cabinet according to the sixth aspect, the latch rib consists of three rib pieces and the center rib piece is higher than the rib pieces on both sides of it. In short, a television cabinet with a latch rib as used in the flat panel television according to the fourth aspect is considered as a useful invention.

According to an eighth aspect of the invention, in the television cabinet according to the sixth or seventh aspect, the rib pieces are tapered. In short, a television cabinet with a latch rib as used in the flat panel television according to the fifth aspect is considered as a useful invention.

As apparent from the above explanation, the present invention brings about the following advantageous effects. The invention of the first aspect provides a rigid LCD television which allows a cable from a speaker to be firmly fixed in a prescribed position on the inside of a front cabinet easily at low cost with reliability.

Also, the invention of the second aspect provides a rigid flat panel television which allows a cable to be fixed firmly in a prescribed position on the inside of a television cabinet at low cost with reliability.

Moreover, according to the invention of the third aspect, a latch rib is securely engaged with a latch rib receptacle.

Also, according to the invention of the fourth, fifth, seventh, and eighth aspects, the worker can easily latch a cable with a latch rib.

Furthermore, the invention of the sixth aspect provides a television cabinet which makes it possible to fix a cable firmly at low cost and engage a latch rib with a latch rib receptacle securely.

BRIEF DESCRIPTION OF THE DRAWINGS

The invention will be more particularly described with reference to the accompanying drawings, in which.

DETAILED DESCRIPTION OF THE PREFERRED EMBODIMENTS

Figure 1:
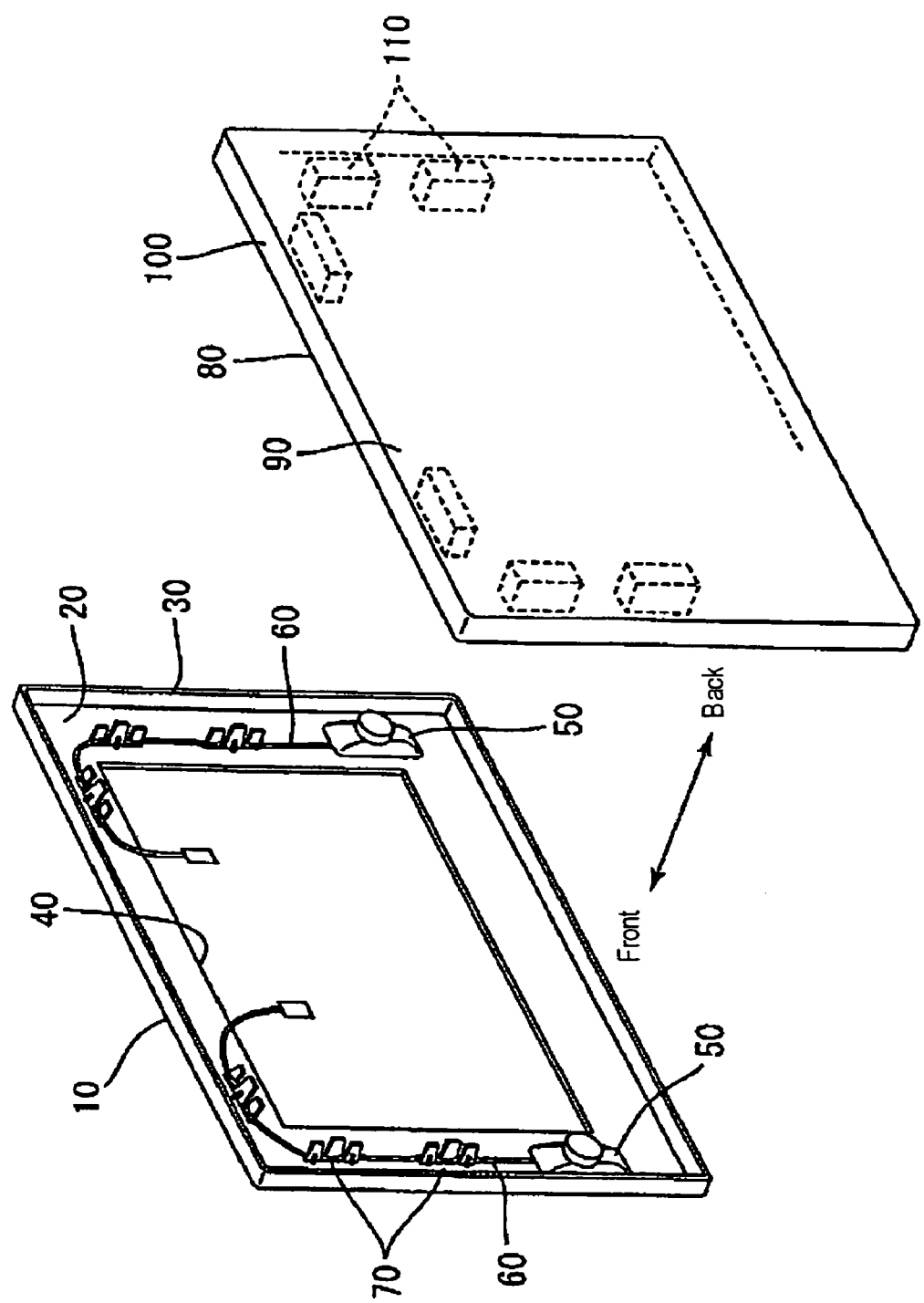
FIG. 1 is a perspective view showing a front cabinet and a rear cabinet in an LCD television.

FIG. 1 shows a front cabinet and a rear cabinet in an LCD television according to a first embodiment of the present invention.

In the figure, a front cabinet 10 and a rear cabinet 80 as viewed from behind are illustrated. There is an opening 40 almost in the center of a front wall 20 of the front cabinet 10. An LCD panel (not shown) is attached to the opening 40 with its display surface facing forward. Side walls 30 extend backward from the top, bottom, left and right edges of the front wall 20.

A speaker 50 is located on each of the right and left sides on the inside of the front wall 20. A cable 60 extends from each speaker 50.

In this embodiment, cable paths are provided to route the cables 60 on the inside of the front wall 20 and latch ribs 70 are arranged in several places on the cable paths. As illustrated in FIG. 1, the cable 60 from each speaker 50 is passed through the latch ribs on the cable path in a zigzag manner so that the cable 60 is fixed on the inside of the front wall 20.

The rear cabinet 80, located behind the front cabinet 10, has a rear wall 90 facing the inside of the front wall 20. Side walls 100 extend forward from the top, bottom, left and right edges of the rear wall 90. Latch rib receptacles 110 which are to engage with the latch ribs 70 are provided in several positions opposite to the latch ribs 70 on the rear wall 90's surface facing the front wall 20. The latch rib receptacles 110 stand almost perpendicularly to the rear wall 90. When the rear cabinet 80 is attached to the back of the front cabinet 10, these receptacles engage with the latch ribs 70 which face them.

Figure 2:
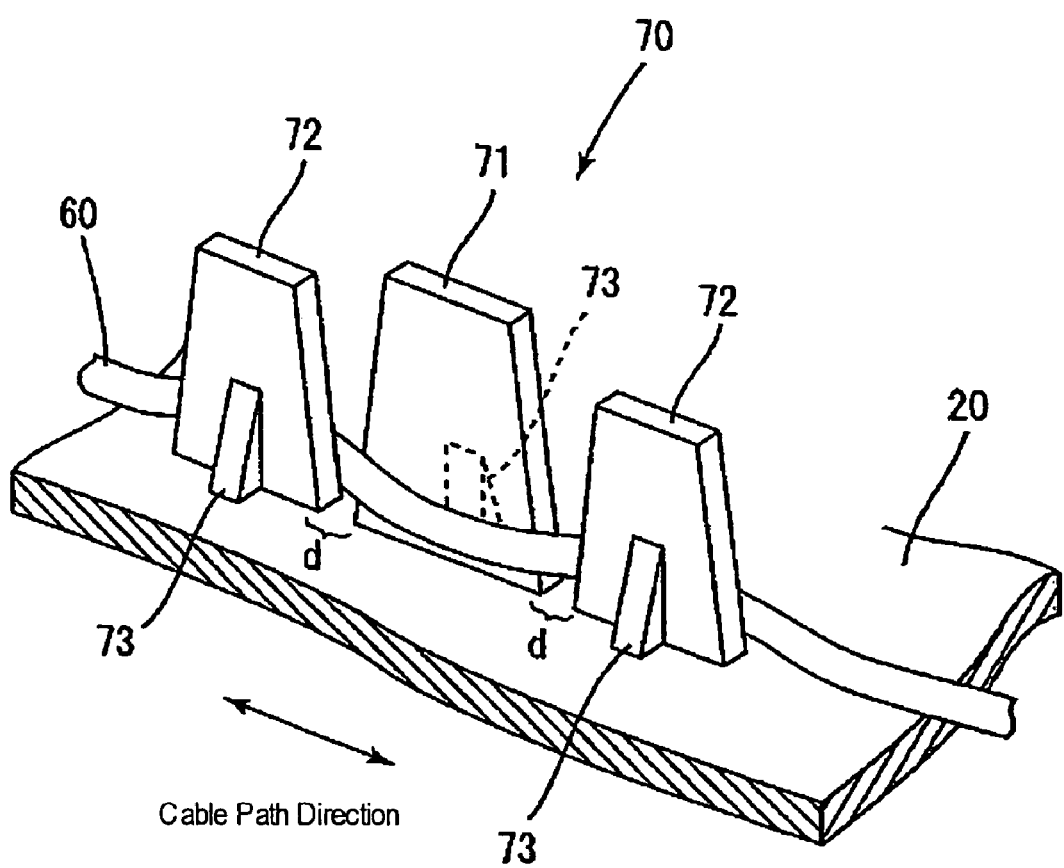
FIG. 2 is a perspective view showing a latch rib.

FIG. 2 is a perspective view of a latch rib 70. As shown in the figure, the latch rib 70 is composed of a virtually plate-like first rib piece 71 and two virtually plate-like second rib pieces 72. The first rib piece 71 stands almost perpendicularly to the front wall 20 and the second rib pieces 72 stand on both sides of the first rib piece 71 almost perpendicularly to the front wall 20 with given gaps d between them. The first rib piece 71 and second rib pieces 72 stand side by side along the path of the cable 60. The first rib piece 71 is higher than the second rib pieces 72 and all the three rib pieces are tapered upward.

Since the first rib piece 71 is higher than the second rib pieces 72, the worker can easily pass the cable through the gaps d by hooking the cable 60 onto the top of the first rib piece 71 to latch the cable 60 with the latch rib 70. Since the rib pieces are tapered upward, the worker can latch the cable 60 more efficiently. In other words, each gap is wider around the tops of the rib pieces than their bottoms, the worker can easily pass the cable 60 through the gaps d in a zigzag manner to latch the cable 60 with the latch rib 70.

As illustrated in FIG. 2, the support members 73 are provided on the alternate wall surfaces of the neighboring rib pieces. In other words, the support members 73 on the second rib pieces 72 on both sides of the first rib piece 71 are on the same side and the support member 73 on the first rib piece 71 is on the opposite side. The cross section of the support members 73 in the direction almost perpendicular to the path of the cable 60 is a virtually right triangle. Each support member 73 is in contact with one wall surface of a rib piece and with the front wall 20 to support the rib piece on the inside of the front wall 20.

When the cable 60 is passed through the latch rib 70 in a zigzag manner, each rib piece receives a force from the cable (which passes in front of one surface of the rib piece) toward the other wall surface of the rib piece. If there should be no support members on the rib pieces, the neighboring rib pieces would incline in alternate directions due to the above force from the cable 60. Therefore, the support members 73, which are attached to the alternate wall surfaces of the neighboring rib pieces, prevent inclination of the rib pieces toward the wall surfaces which do not face the cable 60, or the wall surfaces in front of which the cable does not pass. Hence, the worker can lead the cable 60 through the latch rib 70 in a zigzag manner so that it passes in front of the wall surfaces of the rib pieces on which the support members 73 are not provided.

Figure 3:
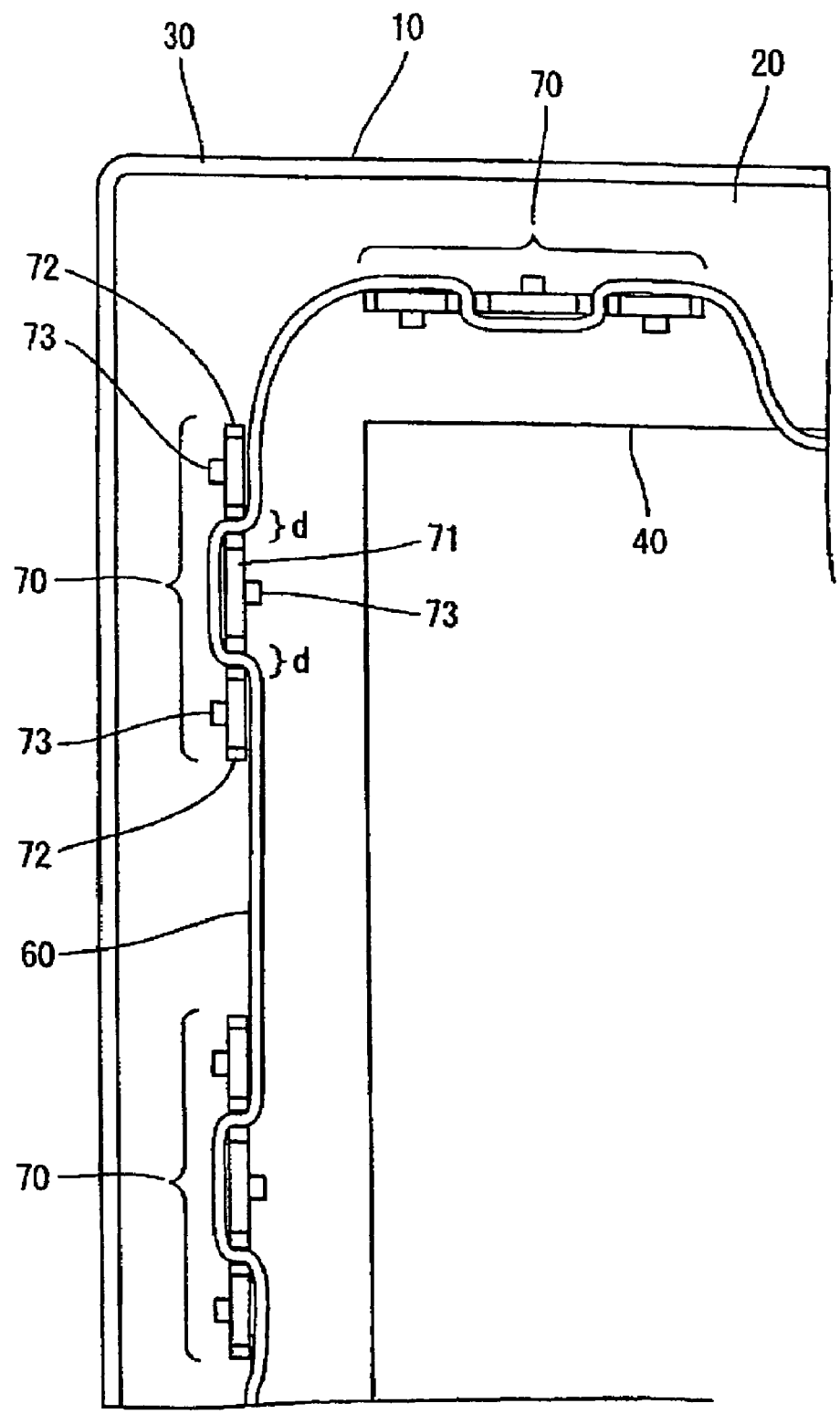
FIG. 3 partially shows the back of a front cabinet.

As shown in FIG. 3 (a fragmentary back view of the front cabinet 10), latch ribs 70 are located in several places on the path of the cable 60 on the inside of the front wall 20. The cable 60 is passed through the latch ribs 70 in a zigzag manner. When It passes through two gaps d in one latch rib 70, it touches the first rib piece 71 and second rib pieces 72. Since the cable 60 touches the first rib piece 71 and one of the second rib pieces 72 as it passes through a gap d, friction resistance is generated in the area of contact with the first rib piece 71 and with the second rib piece 72. This friction resistance prevents slippage of the latched cable even when a tensile force is applied to the cable 60. In other words, it is considered that the cable 60 can be firmly fixed in a prescribed position on the inside of the front wall 20 with a single latch rib 70. This means that when the cable 60 is latched with several latch ribs 70 provided on the cable path, it is very firmly fixed on the cable path on the inside of the front wall 20.

As mentioned above, since the rib piece wall surfaces supposed not to face the cable 60 are provided with support members 73, even when the cable 60 is passed through the latch rib 70 in a zigzag manner, the rib pieces will not incline toward the wall surfaces which do not face the cable 60. As a consequence, the positional relationship among the first rib piece 71 and second rib pieces 72, which constitute a latch rib 70, is held almost linear along the cable path.

The number of latch ribs 70 and their positions are not limited to those shown here. The cable path and the number of latch ribs 70 are arbitrary. Obviously, the number of rib pieces which constitute one latch rib 70 and their shape are also not limited to those shown here. However, because a latch rib 70 stands on the inside of the front wall 20, it should be kept in mind that if the surface of the latch rib 70 as a projecting body which touches the front wall 20 is too wide, a surface sink might be generated on the front wall 20.

Figure 4:
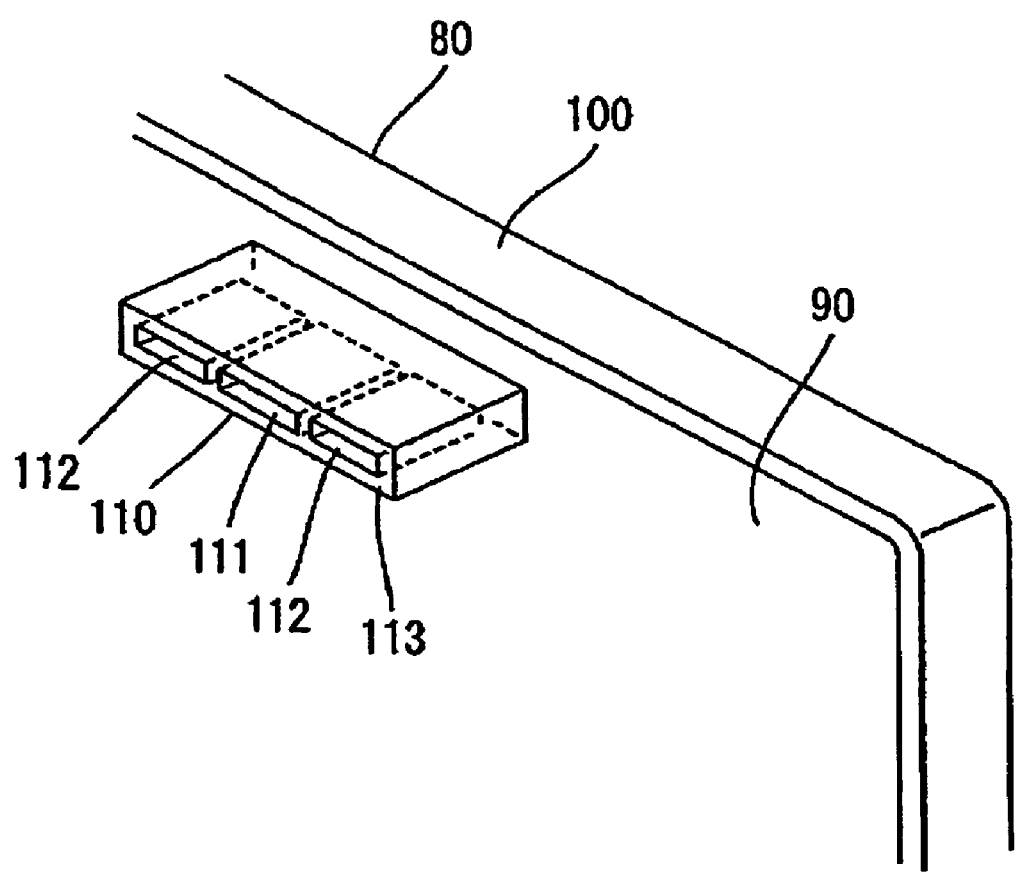
FIG. 4 is a perspective view showing a latch rib receptacle.

FIG. 4 is a perspective view of a latch rib receptacle 110 on the rear cabinet 80. As mentioned above, the latch rib receptacle 110 is located on the surface of the rear wall 90 to face the front wall 20. Latch rib receptacles 110 are provided in several positions to face the corresponding latch ribs 70. Each latch rib receptacle 110 is a virtually rectangular projecting body. Its surface to face the inside of the front wall 20 (hereinafter called the front end face 113) has a recess in which the first rib piece 71 and second rib pieces 72 are inserted. The recess consists of a receptacle recess 111 almost in the center of the front end face 113 and receptacle recesses 112 on both sides of the receptacle recess 111. The receptacle recesses 111 and 112 are in line with each other along the path of the cable 60.

Figure 5:
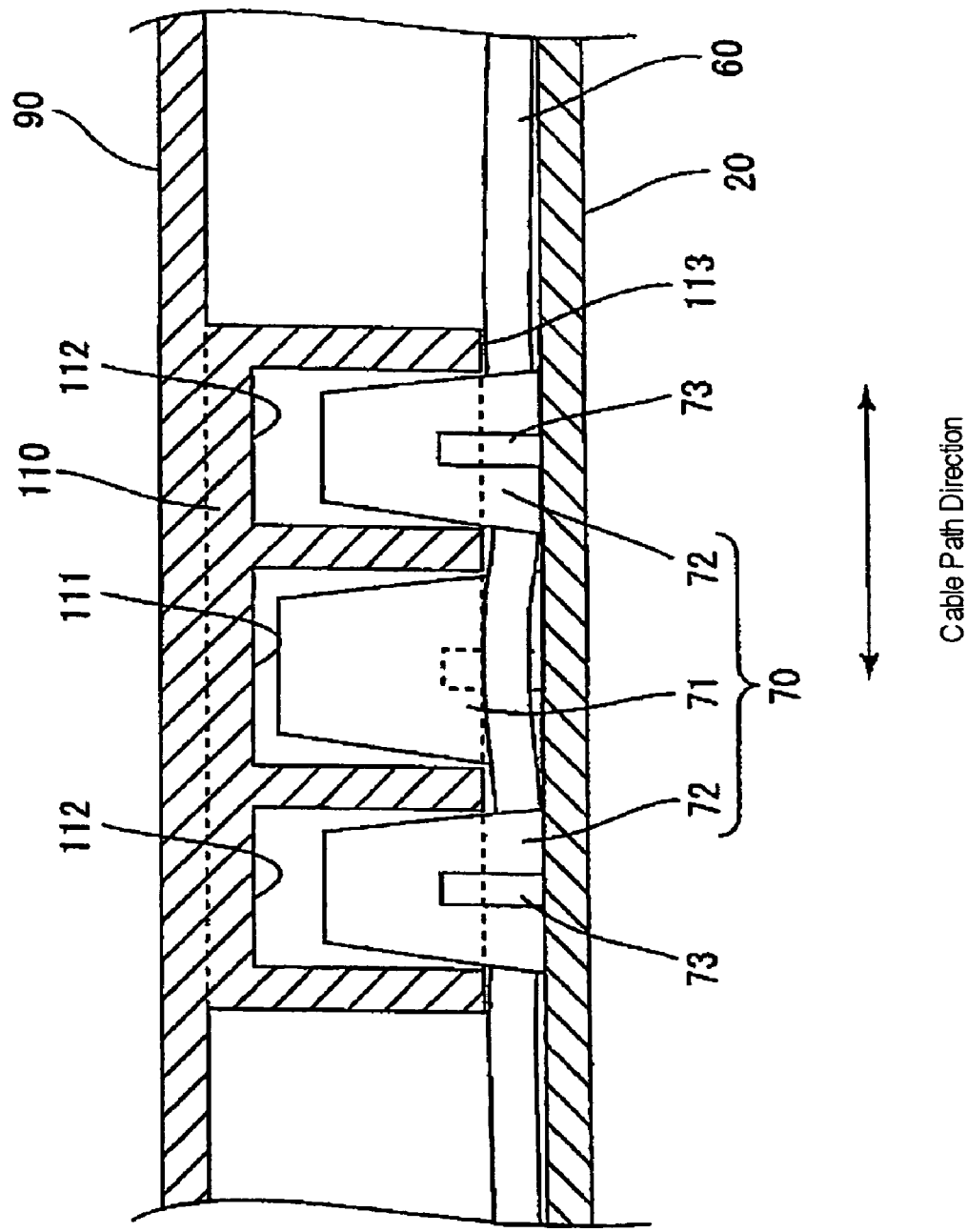
FIG. 5 shows a latch rib receptacle engaged with a latch rib through which a cable is passed.

When the rear cabinet 80 is attached to the back of the front cabinet 10, the latch rib receptacle 110 is engaged with the latch rib 70 as its receptacle recess 111 partially houses the first rib piece 71 and its receptacle recesses 112 partially house the second rib pieces 72. FIG. 5 shows the latch rib receptacle 110 engaged with the latch rib 70 with which the cable 60 is latched.

As illustrated in FIG. 5, the first rib piece 71 and the second rib pieces 72 are inserted in the receptacle recesses 111 and 112 respectively, by a given depth from the top of the first rib piece 71. The tops of the first rib piece 71 and second rib pieces 72 are almost in line with each other along the cable path so that the tops of the first rib piece 71 and second rib pieces 72 face the openings of the receptacle recesses 111 and 112 respectively. Hence, when the rear cabinet 80 is attached to the back of the front cabinet 10, the latch rib 70 and the latch rib receptacle 110 fit and engage with each other.

The first rib piece 71 and the second rib pieces 72 are tapered so that the length of the top of the first rib piece 71 in the cable path direction is shorter than the length of the opening of the receptacle recess 111 in the cable path direction and the length of the top of the second rib pieces 72 in the cable path direction is shorter than the length of the opening of the receptacle recesses 112 in the cable path direction. Therefore, when the worker takes the rear cabinet 80 close to the back of the front cabinet 10 to attach it, even if the latch rib receptacle 110 is somewhat in misalignment with the latch rib 70 in the cable path direction, the first rib piece 71 and the second rib pieces 72 are housed in the receptacle recess 111 and the receptacle recesses 112 respectively. Specifically, since the first rib piece 71 and the second rib pieces 72 are tapered, the worker not only can easily hook the cable 60 onto the latch rib 70 but also easily engage the latch rib 70 with the latch rib receptacle 110. Alternatively, the openings of the receptacle recesses 111 and 112 may be fan-shaped or broadened from the point of a given depth from the front end face 113 inside the recesses 111 and 112 toward the opening front ends of the recesses 111 and 112. If the openings of the receptacle recesses 111 and 112 are fan-shaped, the first rib piece 71 and the second rib pieces 72 in contact with the fan-shaped portions can be easily guided inward into the receptacle recesses 111 and 112.

Once the latch rib 70 is engaged with the latch rib receptacle 110 in this way, the tops of the rib pieces are completely housed so the cable 60 never slips off the latch rib 70. The latch rib receptacle 110 engaged with the latch rib 70 presses the cable 60 passed through the latch rib 70 in a zigzag manner, at its front end face 113. In other words, as the latch rib 70 and the latch rib receptacle 110 are engaged, the cable 60 is sandwiched between the front wall 20 and the front end face 113; therefore, the cable 60 firmly latched with the latch rib 70 is further firmly fixed in the cable path on the front wall 20.

However, it is not always necessary to insert the latch rib 70 into the latch rib receptacle 110 deeply until the cable 60 touches the front end face 113. The cable 60 is fixed firmly enough by passing it through the latch rib in a zigzag manner and in some cases it is better for the front end face 113 not to apply a pressure on the cable 60. How much deeply the latch rib 70 should be inserted into the latch rib receptacle 110 can be adjusted by changing the lengths of the openings of the receptacle recesses 111 and 112 in the cable path direction. The first rib piece 71 and second rib pieces 72 are tapered as mentioned above. Hence, when the lengths of the openings of the receptacle recesses 111 and 112 in the cable path direction are short, the lengths of the inserted first rib piece 71 and second rib pieces 72 in the cable path direction at their shallow level coincide with the lengths of the openings of the receptacle recesses 111 and 112 in the cable path direction and upon coincidence, the front end face 113 stops moving toward the front wall 20.

On the other hand, when the lengths of the openings of the receptacle recesses 111 and 112 in the cable path direction are long, the lengths of the inserted first rib piece 71 and second rib pieces 72 in the cable path direction at their deep level coincide with the lengths of the openings of the receptacle recesses 111 and 112 in the cable path direction and upon coincidence, the front end face 113 stops moving toward the front wall 20. The depth of engagement between the latch rib 70 and the latch rib receptacle 10 can be adjusted not only by changing the lengths of the openings of the receptacle recesses 111 and 112 in the cable path direction but also changing the taper ratio of the first rib piece 71 and the second rib pieces 72.

When the latch rib 70 and the latch rib receptacle 110 are engaged, the whole television cabinet, which consists of the front cabinet 10 and the rear cabinet 80, also becomes more rigid. Generally, a plurality of ribs and bosses are provided inside a television cabinet in order to retain the rigidity of the television cabinet. The front cabinet 10 and the rear cabinet 80 are provided with a plurality of ribs and bosses for reinforcement (not shown). In addition to these reinforcement ribs and bosses (not shown), the latch ribs 70 engaged with the latch rib receptacles 110 also function as reinforcement ribs to increase the rigidity of the television cabinet. When the latch ribs 70 engaged with the latch rib receptacles 110 function as reinforcement ribs to retain a certain level of rigidity of the television cabinet, it is also possible to decrease the number of ribs and bosses which are provided in other places only for the purpose of reinforcement of the television cabinet.

Figure 6:
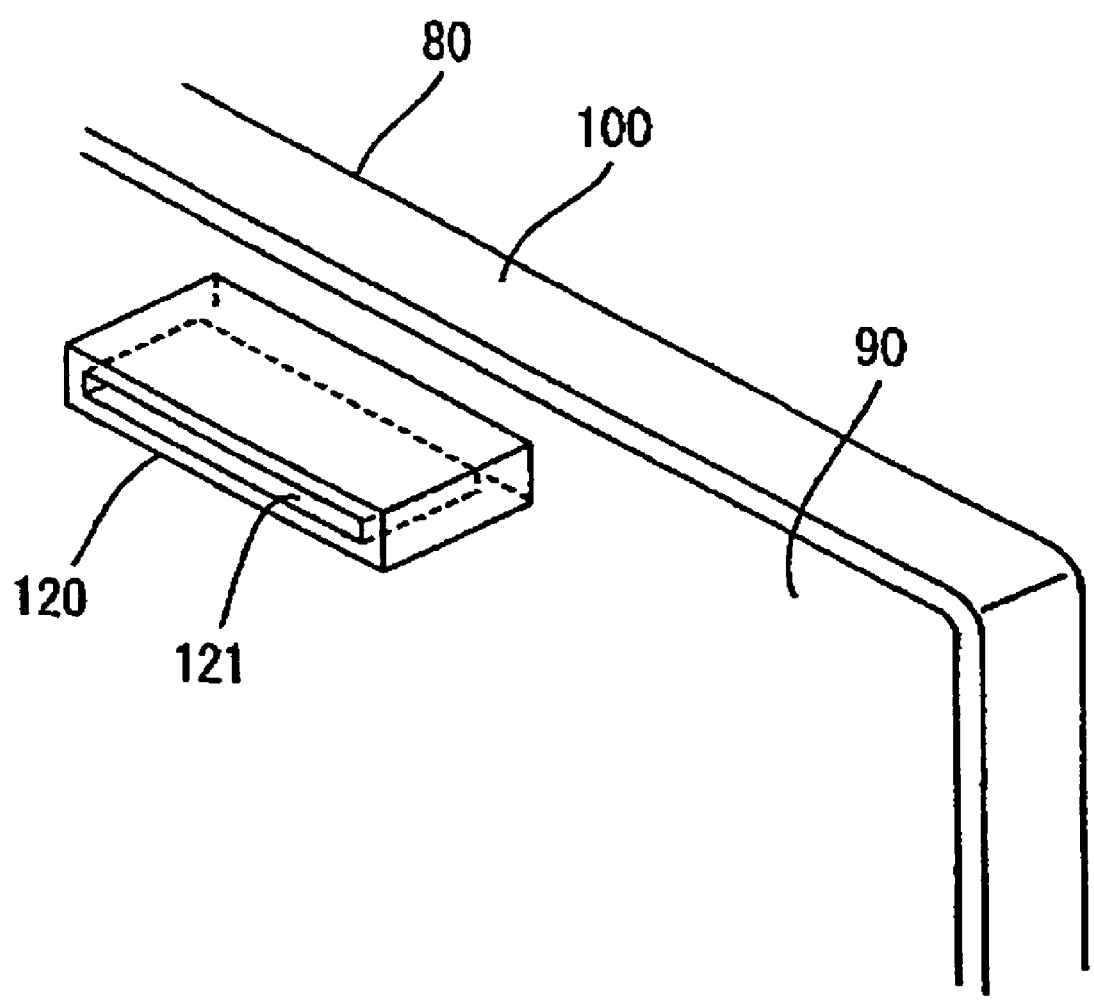
FIG. 6 is a perspective view showing another example of a latch rib receptacle.

The shape of the latch rib receptacle 110 is not limited to the one shown in FIGS. 4 and 5. FIG. 6 is a perspective view of a latch rib receptacle 120 on the rear cabinet 80. Like the latch rib receptacles 110, plural latch rib receptacles 120 are located in the respective positions opposite to latch ribs 70, on the rear wall's surface which faces the front wall 20. Unlike the latch rib receptacles 110, each latch rib receptacle 120 has one oblong receptacle recess 121 in the cable path direction on the rear wall's surface which faces the inside of the front wall 20. This receptacle recess 121 houses all the three rib pieces (the first rib piece 71 and the second rib pieces 72). Even in this case, since the tops of the rib pieces are completely housed, the cable 60 never comes off the latch rib 70. Furthermore, the latch ribs 70 engaged with the latch rib receptacles 120, with the first rib piece 71 and second rib pieces 72 housed in the receptacle recess 121, function as reinforcement ribs to increase the rigidity of the television cabinet.

Figure 7:
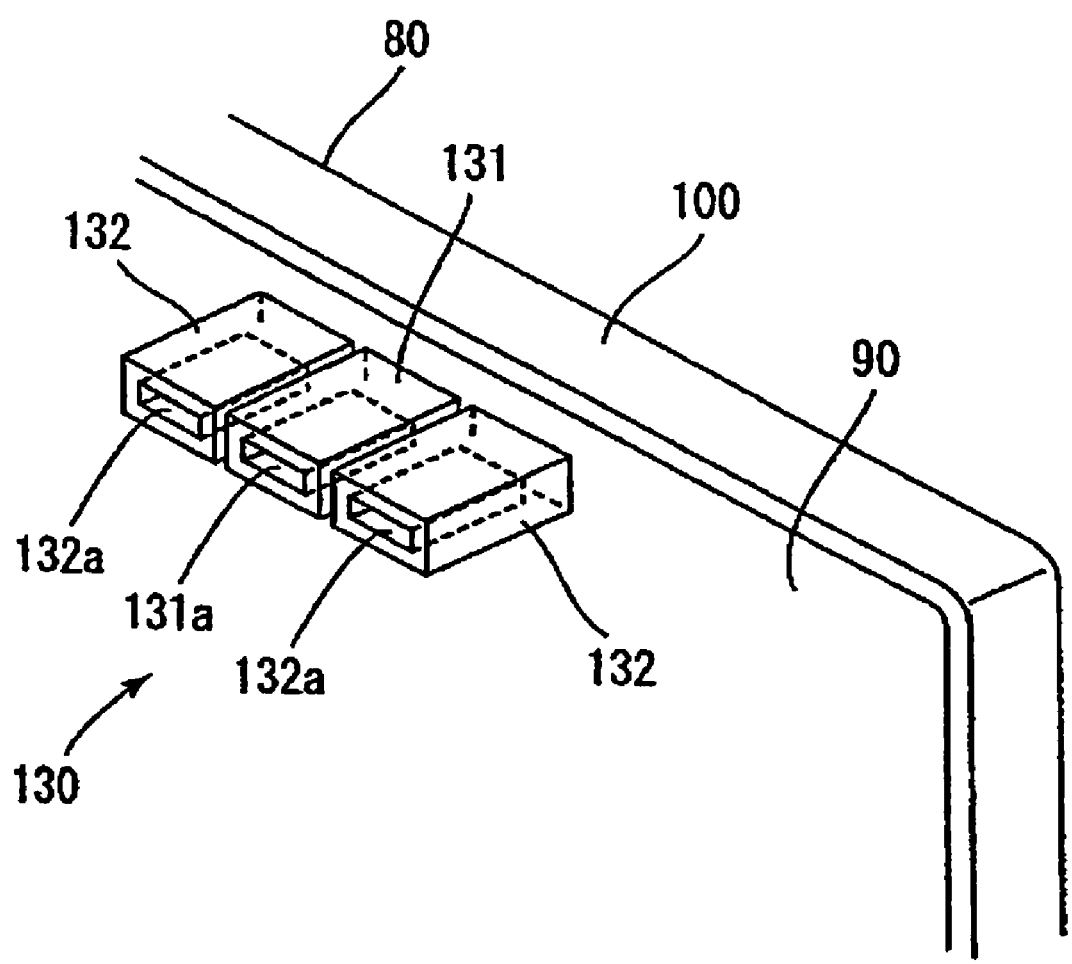
FIG. 7 is a perspective view showing a further example of a latch rib receptacle.

Another alternative approach to the form of latch rib receptacle is that the latch rib receptacle 110 is divided into three sub-receptacles. In other words, the alternative form of latch rib receptacle 130 consists of three projecting bodies each of which constitutes a receptacle recess, as shown in FIG. 7 (perspective view). When the rear cabinet 80 is attached to the back of the front cabinet 10, the latch rib receptacle 130 is engaged with the latch rib 70 as receptacle recess 131*a* of a projecting body 131 houses the first rib piece 71 of the latch rib 70 and receptacle recesses 132*a* of projecting bodies 132 house the second rib pieces 72 of the latch rib 70.

As explained so far, the cable 60 extended from the speaker 50 is passed through the latch ribs 70 in a zigzag manner on the cable path on the inside of the front wall 20 and when the front cabinet 10 and the rear cabinet 80 are joined, the latch ribs 70 are engaged with the latch rib receptacles 110. As a consequence, the cable 60 is firmly fixed on the cable path and never comes off the latch ribs 70. The latch ribs engaged with the latch rib receptacles 110 function as reinforcement ribs to increase the rigidity of the television cabinet which constitutes an LCD television.

What is claimed is:

1. An LCD television in which a cable extended from a speaker housed in a television cabinet, composed of a front cabinet and a rear cabinet, is fixed in a prescribed position on the inside of the front cabinet, wherein the front cabinet has latch ribs in plural places on a front wall of the front cabinet, each of the latch ribs comprising three rib pieces standing on the front wall of the front cabinet almost vertically almost in line with given gaps between them, so as for the cable to be passed through the gaps in a zigzag manner, intact, and in whole, and thereby mechanically and non-electrically fixed without permanently physically altering the cable; and wherein the rib pieces are slightly tapered to a substantially flat top and the center rib piece is higher than the rib pieces on both sides of it and support members are provided on the rib piece wall surfaces which are supposed not to face the cable when the cable is passed through the gaps in a zigzag pattern, in order to prevent inclination of the rib pieces toward those wall surfaces; and wherein the rear cabinet has latch rib receptacles in such plural places that they fit the latch ribs respectively and house the rib pieces of each latch rib with the center rib piece inserted by a given depth from its top when the rear cabinet is attached to the back of the front cabinet.

2. A flat panel type television in which a cable inside a television cabinet is fixed in a prescribed position on the inside of the television cabinet, wherein the television cabinet has, on its inside, a latch rib comprising plural rib pieces arranged almost in line with given gaps between them, so as for the cable to be passed through the gaps in a zigzag manner, intact, and in whole, and thereby mechanically and non-electrically fixed without permanently physically altering the cable; and wherein a latch rib receptacle to be engaged with the latch rib is provided in a prescribed position opposite to the latch rib, on the inside of the television cabinet.

3. The flat panel television as claimed in claim 2, wherein the rib pieces have support members on their wall surfaces supposed not to face the cable when the cable is passed through the gaps in a zigzag manner, in order to prevent inclination of the rib pieces toward those wall surfaces.

4. The flat panel television as claimed in claim 2, wherein the latch rib consists of three rib pieces and the center rib piece is higher than the rib pieces on both sides of it.

5. The flat panel television as claimed in claim 2, wherein the rib pieces are slightly tapered to a substantially flat top.

6. A television cabinet having a latch rib comprising plural rib pieces arranged almost in line with given gaps between them, so as for a cable to be passed through the gaps in a zigzag manner, intact, and in whole, and thereby mechanically and non-electrically fixed without permanently physically altering the cable, wherein each rib piece has a support member on its wall surface supposed not to face the cable when the cable is passed through the gaps in a zigzag manner, in order to prevent inclination of the rib piece toward that wall surface.

7. The television cabinet as claimed in claim 6, wherein the latch rib consists of three rib pieces and the center rib piece is higher than the rib pieces on both sides of it.

8. The flat panel television as claimed in claim 6, wherein the rib pieces are slightly tapered to a substantially flat top.

9. A television cabinet, comprising:
a front cabinet having an opening, a front wall, and a front side wall, including a cable associated with an electronic component;
one or more latch ribs coupled with the front wall of the front cabinet;
the one or more latch ribs include:
a center rib piece and side rib pieces, with the center rib piece and the side rib pieces including an upright section and a support member;
the upright section having a face, a back, a base that is coupled with the front side wall, a substantially flat top, a height, and a thickness, with the upright section configured substantially as an isosceles trapezoid, with the upright section slightly tapered at the substantially flat top and wider at the base, and with the height of the upright section for the center rib piece greater than the height of the upright section for the side rib pieces;
the support member having a thickness, and configured substantially as a triangle, with a first support edge coupled with the back of the upright section, a second support edge coupled with the front side wall, with the first and second support edges forming a right angle vertex;
the center rib piece and the side rib pieces are spaced apart to form gaps, and are aligned substantially in-line, laterally, and face to face, with the center rib piece facing the side rib pieces;
the cable is zigzagged passed through the gaps formed in between the center rib piece and side rib pieces, in whole, intact, and mechanically and non-electrically detachably fixed therein the latch ribs without permanently physically altering the cable;
a rear cabinet configured to mate with the front cabinet, with the rear cabinet including a rear wall and rear side wall;
one or more latch rib receptacles include a front opening and a closed back, with the closed back coupled with the rear wall of the rear cabinet;
the one or more latch rib receptacles are arranged to accommodate and house the center rib piece and the side rib pieces of the one or more latch ribs through the front opening when the rear cabinet is coupled with the front cabinet, with a front opening rim pressed against the cable zigzagged in between the center rib piece and side rib pieces for further securing the cable.

* * * * *